United States Patent
Parmar et al.

(10) Patent No.: US 9,294,621 B2
(45) Date of Patent: Mar. 22, 2016

(54) VIRTUAL MOBILE MANAGEMENT—REMOTE CONTROL

(75) Inventors: Ramesh Parmar, Scotch Plains, NJ (US); Dinesh Doshi, South Plainfield, NJ (US); Deepa Jagannatha, Somerset, NJ (US); Deepak Gonsalves, Avenel, NJ (US)

(73) Assignee: AetherPal Inc., South Plainfield, NJ (US)

( * ) Notice: Subject to any disclaimer, the term of this patent is extended or adjusted under 35 U.S.C. 154(b) by 496 days.

(21) Appl. No.: 13/492,507

(22) Filed: Jun. 8, 2012

(65) Prior Publication Data

US 2012/0254762 A1     Oct. 4, 2012

Related U.S. Application Data

(63) Continuation-in-part of application No. 12/426,555, filed on Apr. 20, 2009, now Pat. No. 8,200,206.

(60) Provisional application No. 61/046,593, filed on Apr. 21, 2008.

(51) Int. Cl.

| | |
|---|---|
| *H04M 3/487* | (2006.01) |
| *G06Q 30/02* | (2012.01) |
| *H04L 29/06* | (2006.01) |
| *H04W 12/00* | (2009.01) |
| *H04W 4/00* | (2009.01) |
| *H04L 29/08* | (2006.01) |
| *H04W 8/22* | (2009.01) |
| *H04W 24/00* | (2009.01) |
| *H04W 28/08* | (2009.01) |
| *H04W 68/00* | (2009.01) |
| *H04W 76/02* | (2009.01) |

(52) U.S. Cl.
CPC .............. *H04M 3/4878* (2013.01); *G06Q 30/02* (2013.01); *H04L 63/20* (2013.01); *H04L 67/02* (2013.01); *H04W 4/001* (2013.01); *H04W 12/00* (2013.01); *H04M 2207/18* (2013.01); *H04W 8/22* (2013.01); *H04W 24/00* (2013.01); *H04W 28/08* (2013.01); *H04W 68/00* (2013.01); *H04W 76/02* (2013.01)

(58) Field of Classification Search
CPC ............... G06Q 20/02; H04M 3/4878; H04M 2207/18; H04W 8/22; H04W 28/08
USPC .......................... 455/418, 420, 410; 715/736
See application file for complete search history.

(56) References Cited

U.S. PATENT DOCUMENTS

| | | |
|---|---|---|
| 5,995,829 A | 11/1999 | Broderick |
| 5,999,521 A | 12/1999 | Thompson |

(Continued)

FOREIGN PATENT DOCUMENTS

WO     2009018268 A2     2/2009

*Primary Examiner* — Ariel Balaoing
(74) *Attorney, Agent, or Firm* — Volpe and Koenig, P.C.

(57) ABSTRACT

Disclosed is a Virtual Mobile Management apparatus and method using a control center system operable to enable remote control of wireless handheld devices based upon the establishment of dedicated communication channels with the wireless device and employing communication protocols to facilitate display capture, key and touch input simulation, and collect device parameters to analyze and compare with predefined parameters and generate a standards deviation report viewable by an authorized user. A device client is resident on the mobile device non-volatile memory and is operable by the end user to invoke the application to request remote control feature.

26 Claims, 6 Drawing Sheets

(56) References Cited

U.S. PATENT DOCUMENTS

| | | |
|---|---|---|
| 6,047,071 A | 4/2000 | Shah |
| 6,144,849 A | 11/2000 | Nodoushani et al. |
| 6,148,197 A | 11/2000 | Bridges et al. |
| 6,201,964 B1 | 3/2001 | Tung et al. |
| 6,378,088 B1 | 4/2002 | Mongan |
| 6,516,188 B1 | 2/2003 | New et al. |
| 6,564,055 B1 | 5/2003 | Hronek |
| 6,615,038 B1 | 9/2003 | Moles et al. |
| 6,625,451 B1 | 9/2003 | La Medica, Jr. et al. |
| 6,684,359 B2 | 1/2004 | Noy |
| 6,907,546 B1 | 6/2005 | Haswell et al. |
| 6,925,405 B2 | 8/2005 | Adir et al. |
| 6,959,433 B1 | 10/2005 | Morales, Jr. et al. |
| 6,970,719 B1 | 11/2005 | McConnell et al. |
| 7,032,212 B2 | 4/2006 | Amir et al. |
| 7,194,264 B2 | 3/2007 | Li et al. |
| 7,286,802 B2 | 10/2007 | Beyme et al. |
| 7,730,189 B2 * | 6/2010 | Harikumar ......... H04W 76/021 370/338 |
| 2003/0156549 A1 | 8/2003 | Binder et al. |
| 2004/0268148 A1 * | 12/2004 | Karjala et al. ................. 713/201 |
| 2005/0192052 A1 | 9/2005 | Tenhunen |
| 2005/0227688 A1 | 10/2005 | Li et al. |
| 2006/0053289 A1 * | 3/2006 | Singh ............................ 713/169 |
| 2006/0053290 A1 * | 3/2006 | Randle et al. ................. 713/169 |
| 2007/0294368 A1 * | 12/2007 | Bomgaars et al. ............ 709/217 |
| 2008/0160956 A1 | 7/2008 | Jackson et al. |
| 2009/0077184 A1 | 3/2009 | Brewer et al. |
| 2009/0264102 A1 | 10/2009 | Parmar et al. |
| 2012/0003960 A1 | 1/2012 | Parmar et al. |
| 2012/0254762 A1 | 10/2012 | Parmar et al. |

* cited by examiner

VIRTUAL MOBILE MANAGEMENT—REMOTE CONTROL

CROSS-REFERENCE TO RELATED APPLICATIONS

This application is a continuation-in-part of U.S. patent application Ser. No. 12/426,555, filed Apr. 20, 2009, entitled VIRTUAL MOBILE AND AD/ALERT MANAGEMENT FOR MOBILE DEVICES, which claims priority of U.S. Provisional Patent Application No. 61/046,593, filed Apr. 21, 2008, entitled VIRTUAL MOBILE AND AD/ALERT MANAGEMENT FOR MOBILE DEVICES, the entirety of which is incorporated herein by reference.

FIELD OF INVENTION

The present invention relates to mobile wireless communication devices, systems, networks and methods of operation. In particular the present invention is directed to mobile wireless communication devices capable of Virtual Mobile Management by remote control.

BACKGROUND

Wireless handheld devices typically communicate with each other over commonly defined standards based wireless protocols. These devices are typically untethered, unlike wired communication devices such as telephones. Wireless operators provide the wireless networking infrastructure and provide service to the end customer. The customer subscribes for such a service from the operators who in turn guarantee a certain degree of quality of service to their customers.

Wireless handhelds are increasingly becoming more powerful and multi-functional with advancements in hardware and operating systems components, thus providing application developers a common set of programming interfaces or APIs to create rich interactive applications. These applications are either pre-installed prior to commercial shipment or downloaded over-the-air by the customer. Due to the varied complexity of these "smart" device and the applications that execute within them, customer seeks operator's support to troubleshoot their devices.

The customer care organization may require troubleshooting software to provide effective customer support. It may be advantageous to provide an apparatus that provides remote control and diagnostic capabilities to the customer care for effective troubleshooting.

SUMMARY OF THE INVENTION

The Virtual Mobile Management apparatus and method of the instant invention employs a control center system operable to enable remote control of wireless handheld devices based upon the establishment of dedicated communication channels with the wireless device. Communication protocols are employed to facilitate display capture, key and touch input simulation, and collect device parameters to analyze and compare with pre-defined parameters and generate a standards deviation report viewable by an authorized user. A device client is resident on the mobile device non-volatile memory and is operable by the end user to invoke the application to request remote control feature. Features and Functionalities of apparatus and method include:

Streaming Optimization: Efficient usage of over-the-air resources while streaming Device Information: Technician can view all the device details like memory, processor occupancy, operator, device ID, ESN etc Application List Process List Multiple Remote Control sessions Technician can connect to multiple devices and start remote control session from the same console Session Recovery: The device can recover the session due to RF loss, reboot, switching between different Networks like WiFi and Operator Network etc. enabling the technician to continue troubleshooting Session Control Tools: Remote Control provides the technician with several session control tools like Session Stop, Pause, Resume, Snapshot, Record, Image Resize, Resolution change, Unified Keypad with seamless integration of desktop keyboard, and session password for security Connection Mode: Technician can start the remote control session in two different modes User initiated (user will request for remote session) and Network initiated (technician will invoke the remote session)

Chat Support: During the remote control session the technician and user can have a chat session Session Queuing: User initiated session requests are queued for the technician to attend the request which in turn will save the support request duration VMM-RC can be extended to support PC users. (tethered mode connection)

Application Shortcuts

Access Control List

VMM-RC technician console provides the ability to support remote control view with replication of actual device screen rotation with press and hold features of the device Export Device Data: All the data that is queried during VMM-RC session can be exported from the technician console Session History and Notes Device Skin: The technician console provides the remote view of the device along with the device skin VMM-RC support for Wi-Fi only devices Send arguments to device during VMM-RC session: This feature will allow the customer care representative to send arguments to the device. The best example would be to send a web address when a browser is opened on the device remotely.

Highlight device mis-configuration or threshold violations

Automated Video Session recording

Session Data Transfer Monitoring

Ad/Alert Notification is a revolutionary feature where customized messages can be sent periodically to a single or group of mobile devices. For example a customer needs to be notified for some important event like "Registering for Training schedule" or "Bank transaction alerts" etc. There are two types of banners that are supported currently:

Simple Alerts: Simple messages with short text

Confirmation Alerts: Notifications which requires user response/confirmation for the message received System provides reporting tools for the technician or administrator to view the history of all the session activities that has taken place and status of those sessions.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
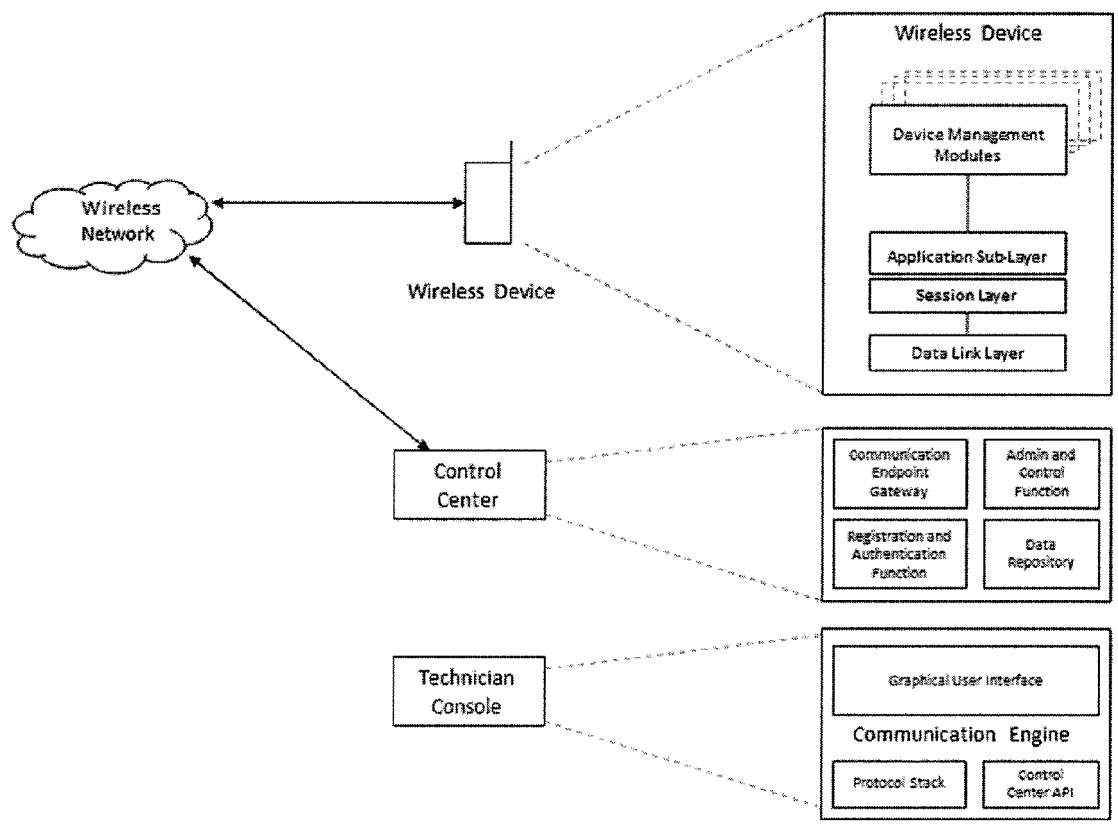
FIG. 1 is a block diagram of component parts to the instant invention.

Referring to FIG. 1, the Virtual Mobile Management Remote Control (VMM-RC) is a tool for use with customer care representatives to remotely view and control the mobile devices. The key components of the VMM-RC system include a Technician Console where care agents interact with the remote devices; Device Remote Control Servers responsible for the data management (DB Servers), device management, web services, analytics, security management and administrative services; and Device Connection Management servers responsible to maintain the live remote data connection with mobile devices.

The primary responsibility of the Communication End Point Gateway is to manage the device connections within the system. The server provides communication endpoints between Control Center (Technician Console, Admin and Control Function) and the device; which allows for multiple requests to be serviced within one session from multiple consoles. The server also provides a consistent manner of device connection and Tool service in a system with heterogeneous devices running different operating systems. The server further provides load balancing across multiple Connection Handlers on each Communication End Point Gateway Server in order to minimize single point of failure.

Figure 2:
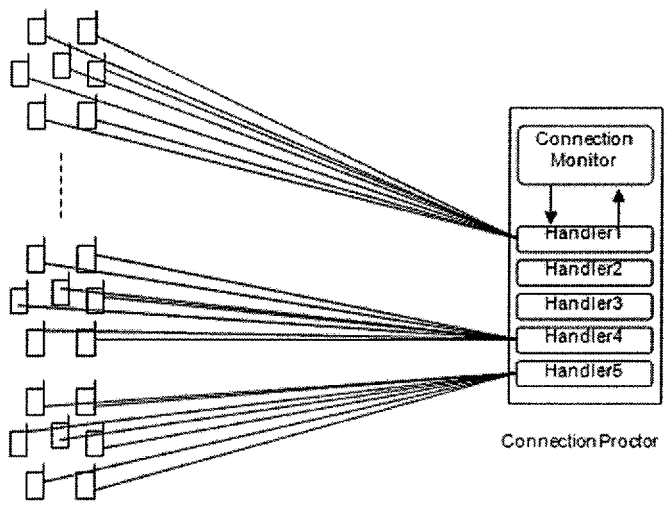
FIG. 2 is a block diagram of the connection monitor.

The Connection End Point Gateway server is comprised of a Connection Monitor, FIG. 2, and a Connection Handler. The Connection Monitor creates and manages Connection Handlers, creates Session ID for new connection requests, and monitors all the scheduled and existing sessions. The Connection Handler is setup for every Connection Proctor, where the number of Connection Handlers is configurable; all the sessions are load distributed across the Connection Handler; and each handler handles multiple device sessions.

Functions are assigned to the following areas: Admin and Control Function has a primary responsibility is to administer and manage all types of communication between the Control Center and the client devices. The Administrative Service is designed to be central administration entity of the entire VMM-RC system. Through this service, system administrators perform administration ,management and instrumentation all the servers within the system, create and maintain multiple tenants, assign tenant administrator roles, etc . . . The Management Service provides the operational end point to the system with the primary functions of Management Service being: Load distribution among the CEG, Management of device registration, Administration of devices. Administration of users, zones, policies, roles, etc., and Session Queuing.

Management Entity is responsible in providing the Management service with an in-memory data store for key operational data such as ACL, user/group/zone structures, etc. The Service Coordinator is responsible in coordinating the communication between various elements within the System. It provides the database interface to the Registration and Authentication Function in the Control Center. All services register themselves with this service. This service is responsible for service discovery.

A Registration and Authentication Function provides a single point of entry for all devices for enrollment and authentication services during VMM-RC session. It comprises of the following components: Registration Service—during Auto-Enrollment, devices are required to register themselves with this service, prior to enrolling themselves; Enrollment Service—this service is responsible to enroll registered devices with the system. Enrollment process is defined in detail in the later sections of the document; Software Update—this service manages the various client packages in the system. Devices connect to this service to request for client update. If an update is available, the service will provide the appropriate client download link; Device Management—this service provides the enrolled devices an interface to update its parameters in the system such as MDN when the device detects a change; Anchor Admin—this service provides the administration component.

The Technician Console provides a graphical user interface to manage and control the Mobile Devices. The following provides list of functions that can be performed using the console: Begin pre-enrollment requests; manage all RD Mobile devices; service the infrastructure of the Control center; perform administrative tasks, VMM-RC.

A Data Repository stores all the information about the VMM-RC Mobile devices, server configuration, tasks and status settings. These databases are pivotal to configure and update managed devices and server components. It is also responsible to maintain the user login information as well as device authentication information. The system comprises 3 database elements; an Admin DB maintains all the system configurations, tenant configuration and management information, system administration and server instrumentation data. This database is accessed by the AetherPal System Admin Service; an Ops DB maintains data that is required for the operations of the system such as device enrollment, Access Control List (ACL), groups, users, zones, etc. This database is accessed by the AetherPal Management Service and the Service Coordinator; and a Reports DB contains historical data of device enrollment, session, audit, report views, and so forth.

Figure 3:
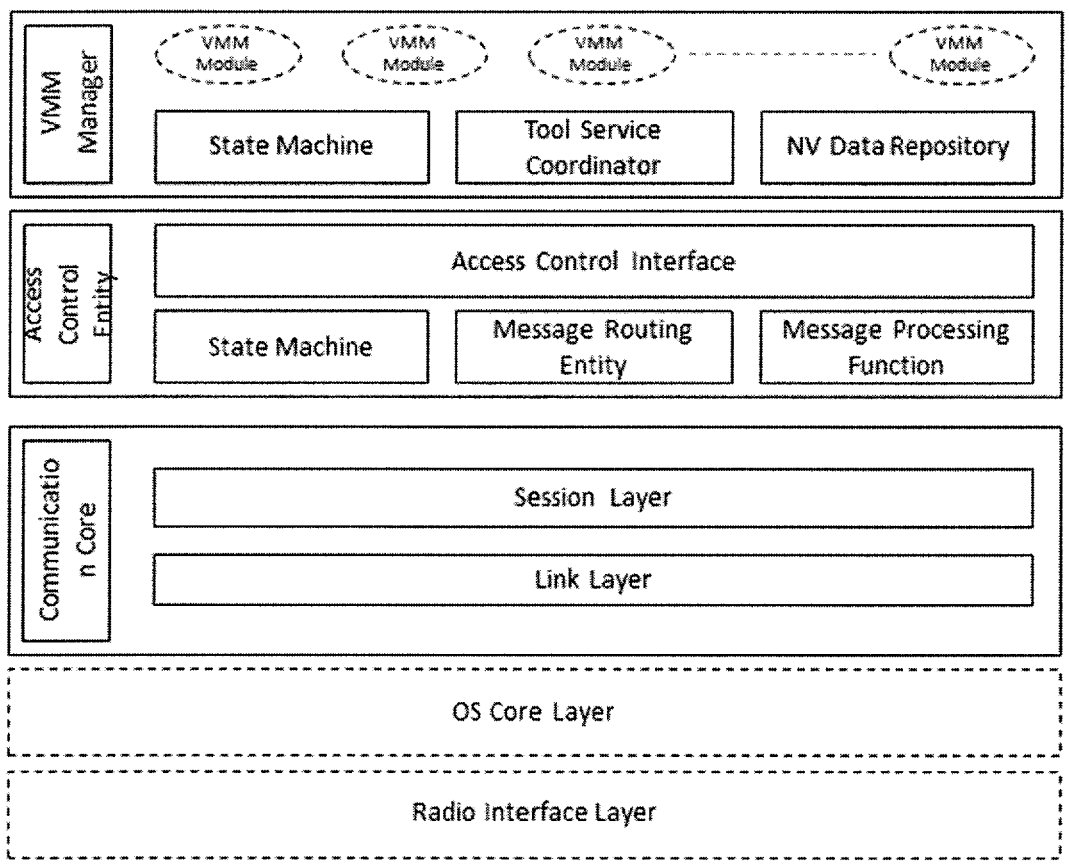
FIG. 3 is a block diagram of the Client Protocol Architecture.

Referring to FIG. 3, the virtual mobile management system is defined by the use of: VMM modules provide a multitude of tool services. Tool Services are grouped together that exhibit common functionality such as Remote Control, File Manager, Device Management, and the like; a State Machine defines a set of shared states that the tool service on the device application shares with the server; a Tool Service Coordinator to maintain a collection of active tool service instances that are currently being serviced by the VMM application. This entity maintains the lifetime of all Tool Services, and is responsible in creating and destroying Tool Services; a NV Data Repository for authentication and authorization specific data that is shared between the VMM application and the server is maintained within the NV data repository. This data repository also serves the purpose of maintaining Tool Service configuration as well as VMM configuration data.

Access Control Entity layer provides a set of functions to the Tool Services to communicate with the Control Center. It provides in the encapsulation of messages before forwarding it to the Communication Core. This layer is responsible to invoke an instance of the Communication Core layer and provides a state machine that defines the state of the VMM application. An Access Control Interface provides a set of standard Application Programmer Interface or API to the Tool Services. These APIs provide a consistent communication platform to facilitate both synchronous as well as asynchronous communication. The ACI State Machine identifies the overall state of the VMM application. State transitions within the ACE State Machine triggers events that are handled by the VMM layer. The states are Open and Closed. Traffic flows through the ACI layer only in the Open State. The Message Routing Entity is responsible for routing all signal messages, destined to Tool Services to the respective event handlers. The Message Processing Function is a signal message pre-processor. This entity receives signal messages from the Session Layer destined towards Tool Services. It de-frames these messages prior to forwarding it to the Message Routing Entity to apply routing rules. Messages that are destined to the server from Tool Services are encapsulated here.

The Communication Core Layer is responsible to setup and maintain a dedicated communication channel with the Control Center. This layer provides the necessary framework to transport messages between the upper layers and the Control Center. It provides message encapsulation, framing, fragmentation and packet re-construction of Tool Service messages.

Figure 4:
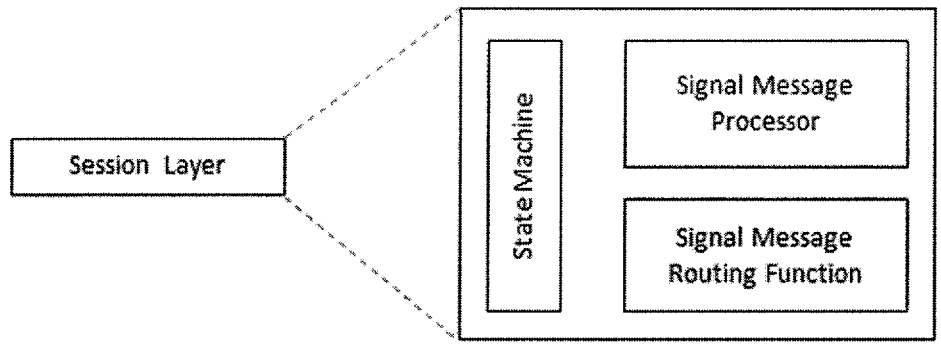
FIG. 4 is a block diagram of the Session Layer.

Referring to FIG. 4, the session layer maintains a set of shared state between the Communication Endpoint Gateway (CEG) and the application. The session layer packets encapsulate signal messages that are transported between the CEG and the application. Each message within the session layer packet defines the source and destination to which the signal messages are to be delivered. The session layer consists of the following entities:

The state machine entity maintains a state within a predefined set of shared states between the application and the CEG. State changes within the state machine trigger the execution of state transition procedures within the application.

This signal message processor entity is responsible to encapsulate and process signal messages that are transmitted between the CEG and the application. This entity is also responsible in influencing the state transition within the state machine by altering its state. Signal messages destined to VMM modules are forwarded to the Signal Message Routing Function.

This signal message routing function entity is responsible to forward signal messages to the appropriate destination. Signal messages destined to VMM modules are directly forwarded to VVM Tool Service Coordinator. Signal messages destined to the CEG are forwarded to the link layer.

Figure 5:
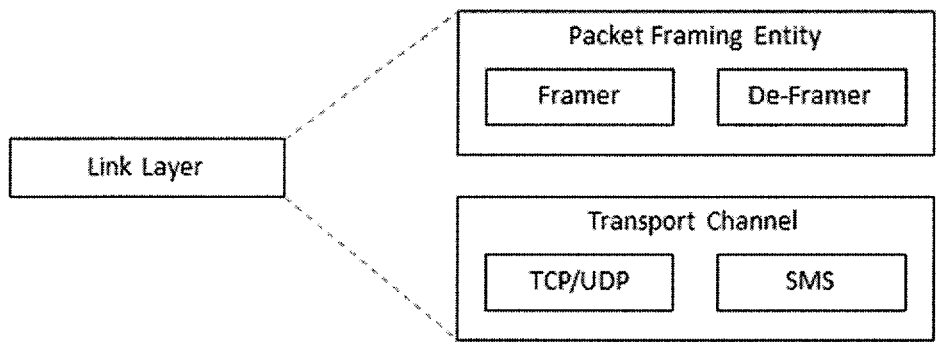
FIG. 5 is a block diagram of the Link Layer.

FIG. 5 depicts the link layer responsible to establish and maintain a dedicated communication channel between the client and the CEG. The Link Layer encapsulates all messages within its frame prior to forwarding it to the network. Packets that are received by the Link Layer from the network are re-constructed and de-framed prior to forwarding it to the upper layer. The following components form the Link Layer. This layer checks for message integrity.

The Packet Framing Entity is responsible to encapsulate messages into Link Layer frames. These frames are then forwarded to the Transport Channel, to be forwarded to the network layer. When a network packet is received by the Packet Framing Entity, it inspects the packet and verifies the integrity of the packet. Malformed packets are silently discarded.

The Transport Channel binds to the appropriate transport layer of the underlying operating system, which is dependent upon the VMM Tool Service. It is responsible to forward messages to the network layer and receives messages from the network layer. It provides notification to the upper layer on the state of the network layer through asynchronous events.

Figure 6:
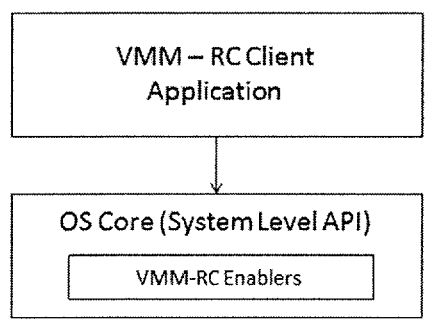
FIG. 6 is a block diagram of the VMM-RC client application.

Referring to FIG. 6, the VMM-RC on the Mobile Device is accomplished with two key components which include VMM-RC Application and VMM-RC Enabler Entity. The VMM-RC Enabler is a System Level Application while the VMM-RC Application resides at the Operating System Application layer.

The VMM-RC Application provides Core Tool services, to manage the remote control session, collect the desired device diagnostics, provide self-care support for remote session activation and manage security protocol. The key features that are required by VMM-RC application to manage devices remotely include: Display Capture, this method involves the capturing of device screen; Key event Injection, this method involves the injection of key events into the device screen; Touch event injection, this method involves the simulation of touch events on the device screen; Device Information, getting the device information like network, power status, MNC, MCC, IMEI, IMSI, ESN, battery level of the smart phone etc., this is of value to the remote technician.

A VMM-RC Enabler performs the key functions: Intercepts all the SMS; keeps the VMM-RC Application to its current version; if the VMM-RC Application is removed accidentally the VMM-RC Enabler shall connect to the server and download the application and installs the same.

The User Initiated VMM-RC session is established with a server through the following phases: Device Enrollment; User Initiated Session; End to End Session Establishment; and Graceful Termination of the VMM-RC Session.

Figure 7:
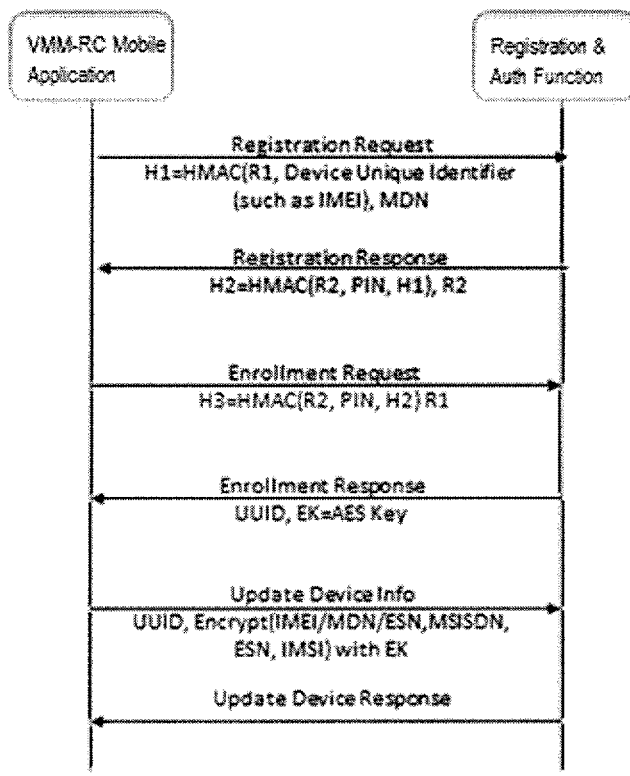
FIG. 7 is a block diagram of the Enrollment procedure.
Figure 8:
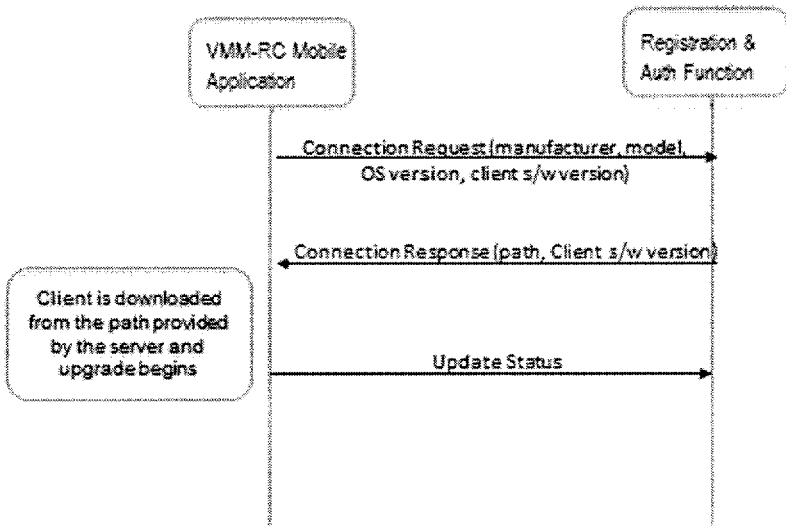
FIG. 8 is a block diagram of the Re-enrollment procedure.

Device Enrollment: Before a Mobile device can connect to the Server, it must establish itself as a known and authenticated object in the system. In general, this is accomplished by Mutual Authentication, Enrollment Request, and Enrollment Response. FIG. 7 depicts the device enrollment.

If for any reason the enrollment failed the VMM-RC Mobile application shall retry the enrollment process at a later time. For any SIM/MDN change the device will reboot as part of the standard procedure. Hence during boot-up the VMM-RC Mobile application shall detect the below changes: Device is previously Enrolled, SIM/MDN Change, Check for client upgrade. Before proceeding ahead with the re-enrollment process the VMM-RC Mobile application shall check if the data connectivity is available on the mobile device. Else it will retry at a later time.

Before the enrollment process begins the VMM-RC Mobile Application checks with the server to see if there is any client upgrade required on the mobile device.

Figure 9:
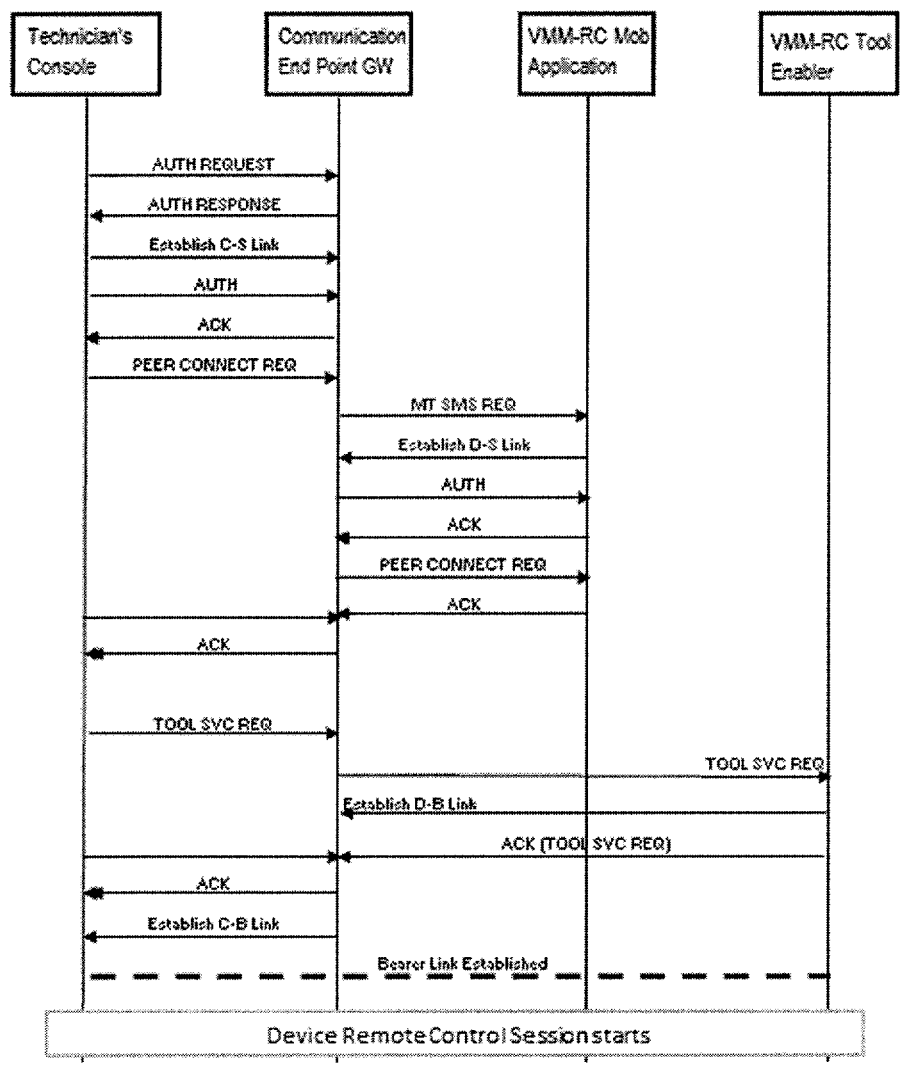
FIG. 9 is a call flow diagram of how the DRC session is established with the mobile device.

Referring to FIG. 9 the call flow depicted describes the step by step procedure of how the end-to-end DRC session is established with the mobile device.

Step 1: When a Connection request is made for a VMM-RC connection, the technicians' Console authenticates with its peer.

Step 2: Technician's console sends a PEER_CONNECT request to the Communication End Point Gateway.

Step 3: The server authorizes the Connection Request and sends the PEER_CONNECT request to the relevant device.

Step 4: When the client receives the PEER_CONNECT request message it has to send an ACK or NAK based on its current state.

Step 5: Once the Server receives an ACK it will make the VMM-RC request with the Client.

Step 6: Based on the response (ACK or NAK) the Communication End Point Gateway will establish a peer-to-peer connection or disconnect the session.

During the VMM-RC session the technician will be able to query device information like process list, list of applications installed/running on the device, device manufacturer details etc . . . , from the mobile device in session.

Figure 10:
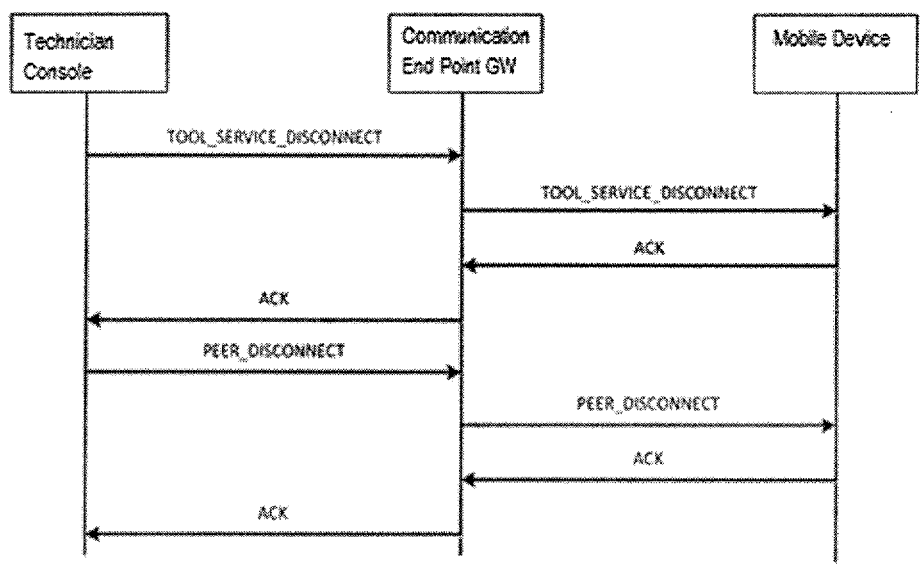
FIG. 10 is a block diagram on the session exit.

Referring to FIG. 10, after the session is complete, the Mobile device client and Server gracefully terminates the connection.

The invention claimed is:

1. A virtual mobile management apparatus for mobile devices, comprising:
at least one server including a Registration and Authentication Function to provide a single point of entry for all mobile devices for enrollment and authentication services during a remote session;
a technician console providing a graphical user interface to manage and control said mobile devices that are enrolled and authenticated, said technician console providing remote session control tools selected from the group of Session Stop, Pause, Resume, Snapshot, Record, Image Resize, Resolution change, Unified Keypad, application shortcuts and session password for security, said session control tools facilitate display capture, key and touch input simulation and collect device parameters to analyze and compare pre-defined parameters; and
a data repository for storing information about said mobile devices, server and tenant configurations and for use in generating a standards deviation report viewable by an authorized user,
wherein mutual authentication is established between the at least one mobile device and the technician console, between the technician console and the at least one server, and the mobile device and the at least one server,
wherein communication protocols employed between the at least one server, the mobile device and the technician console provide efficient usage of over-the-air resources while streaming, provide remote session recovery due loss of communications, and provides support of remote control view with replication of actual mobile device screen rotation with press and hold features of the mobile device and provides load balancing across multiple connection handlers on each communication end point gateway server in order to minimize single point of failure.

2. The virtual mobile management apparatus according to claim 1 wherein a user can request a technician to start a remote control session.

3. The virtual mobile management apparatus according to claim 2 wherein a user initiated session request is queued for the technician to attend to the request.

4. The virtual mobile management apparatus according to claim 1 wherein said technician invokes the remote session.

5. The virtual mobile management apparatus according to claim 1 wherein said technician can connect to multiple devices and start a remote control session from the same technician console.

6. The virtual mobile management apparatus according to claim 1 wherein said data repository maintains historical data of device enrollment, session, audit, and report views.

7. The virtual mobile management apparatus according to claim 1 wherein said data repository is accessed by an admin server.

8. The virtual mobile management apparatus according to claim 1 wherein said technician is able to view device details and device vitals including at least device memory, device processor occupancy, device operator, device ID, and device ESN.

9. The virtual mobile management apparatus according to claim 1 wherein said technician and user can have a chat session.

10. The virtual mobile management apparatus according to claim 1 wherein data that is queried during the session can be exported from the technician console.

11. The virtual mobile management apparatus according to claim 1 wherein arguments including at least a web address can be forwarded to said device during the session.

12. The virtual mobile management apparatus according to claim 1 wherein an Ad/Alert Notification is forwarded to the mobile device.

13. A virtual mobile management apparatus for mobile devices, comprising:
at least one server configured to provide a single point of entry for all mobile devices for enrollment and authentication services during a remote session;
a console configured to provide a graphical user interface to manage and control the mobile devices that are enrolled and authenticated;
the console configured to provide remote session control tools; and
a data repository configured to store information about at least the mobile devices,
wherein communications between the at least one mobile device and the technician console is performed peer-to-peer;
wherein mutual authentication is established between the at least one mobile device and the console, between the console and the at least one server, and the mobile device and the at least one server;
wherein communication protocols employed between the at least one server, the mobile device and the technician console provide efficient usage of over-the-air resources while streaming;
wherein the communication protocols employed between the at least one server, the mobile device and the technician console provide remote session recovery due to loss of communications; and
wherein the communication protocols employed between the at least one server, the mobile device and the technician console provide support of remote control view with replication of actual mobile device screen rotation with press and hold features of the mobile device.

14. The virtual mobile management apparatus according to claim 13, further comprising:
the console configured to receive a request to start the remote session.

15. The virtual mobile management apparatus according to claim 13, further comprising:
the console configured to initiate a request to start the remote session.

16. The virtual mobile management apparatus according to claim 13, wherein a user initiated session request is queued for the console to attend to the request.

17. The virtual mobile management apparatus according to claim 13, further comprising:
the console configured to invoke the remote session.

18. The virtual mobile management apparatus according to claim 13, further comprising:
the console configured to connect to multiple mobile devices and start remote sessions from the same console for each mobile device.

19. The virtual mobile management apparatus according to claim 13, further comprising:
the console configured to view mobile device details including at least device memory, device processor occupancy, device operator, device ID, and device ESN.

20. The virtual mobile management apparatus according to claim 13, further comprising:
the console configured to have a chat session with a user of the mobile device.

21. The virtual mobile management apparatus according to claim 13, further comprising:
the console configured to export data that is queried during the remote session.

22. The virtual mobile management apparatus according to claim 13, wherein mutual authentication is established between the at least one mobile device and the technician console.

23. The virtual mobile management apparatus according to claim 1 wherein communications between the at least one mobile device and the technician console is performed peer-to-peer.

24. The virtual mobile management apparatus according to claim 13, wherein the communication protocols employed between the at least one server, the mobile device and the technician console provide load balancing across multiple connection handlers on each communication end point gateway server in order to minimize single point of failure.

25. The virtual mobile management apparatus according to claim 13, wherein applications are pre-installed on the mobile device.

26. A virtual mobile management apparatus for mobile devices, comprising:
at least one server configured to provide a single point of entry for all mobile devices for enrollment and authentication services during a remote session;
a console configured to provide a graphical user interface to manage and control the mobile devices that are enrolled and authenticated;
the console configured to provide remote session control tools; and
a data repository configured to store information about at least the mobile devices,
wherein mutual authentication is established between the at least one mobile device and the console, between the console and the at least one server, and the mobile device and the at least one server; and
wherein the communication protocols employed between the at least one server, the mobile device and the technician console provide support of remote control view with replication of actual mobile device screen rotation with press and hold features of the mobile device.

* * * * *